United States Patent [19]
Lebail et al.

[11] 3,803,606
[45] Apr. 9, 1974

[54] ECHO-SOUNDING APPARATUS USING FOURIER TRANSFORMATION

[75] Inventors: Patrick Lebail, Neuilly-sur-Seine; Anne-Marie Faugeras, Paris; Alain Castanet, Saint-Michel-sur-Orge, all of France

[73] Assignee: Compagnie Industrielle des Telecommunications Cit-Alcatel, Paris, France

[22] Filed: July 28, 1972

[21] Appl. No.: 276,051

[30] Foreign Application Priority Data
July 28, 1971 France .............................. 71.27668

[52] U.S. Cl. ................................. 343/17, 340/5 H
[51] Int. Cl. ............................ G01s 9/66, G01s 7/04
[58] Field of Search ............ 340/5 H, 5 MP; 343/17

[56] References Cited
UNITED STATES PATENTS

| | | |
|---|---|---|
| 3,675,472 | 7/1972 | Kay et al. ..................... 340/5 MP X |
| 3,685,051 | 8/1972 | Wells ................................... 343/17 |
| 3,717,843 | 2/1973 | Farrah et al. ..................... 343/17 X |
| 3,719,922 | 3/1973 | Lopes et al. ...................... 343/17 X |

*Primary Examiner*—T. H. Tubbesing
*Attorney, Agent, or Firm*—Craig and Antonelli

[57] ABSTRACT

An echo sounding apparatus having a source of coherent waves and an array of detectors each providing an output signal significant of the phase and amplitude of that portion of a wave reflected from the target to which the coherent wave from the source is directed. Sampling circuitry samples the outputs of the detectors at periods delayed with respect to a sampling origin time by an amount proportional to the square of the distance from the sampled detector to a reference point in the array. A calculator is then provided for carrying out a Fourier transformation on each sample to provide an output signal representative of the target.

11 Claims, 2 Drawing Figures

ECHO-SOUNDING APPARATUS USING FOURIER TRANSFORMATION

The present invention relates to holographic echo-sounding, that is to say echo-sounding comprising the following operations: irradiation of a target by means of a coherent wave of appropriate frequency, reception of the reflected waves from the target on an array of detectors sensitive to the amplitude and phase of the reflected waves, and the treatment of the data provided by the detector output signals. The irradiation may be by ultrasonic mechanical waves, in water for example. The coherent waves may also be electromagnetic, and the propagation medium may be solid.

These detectors provide periodic output signals representative in amplitude and phase of the reflected waves received. It has been proposed to process these signals in a data processing system which may be of the digital type. It has been proposed to sample these reception signals by recording their values at appropriately chosen sampling periods, the sampled values being processed in a calculator so as to carry out a Fourier transformation in relation to the coordinates identifying the detector position in the array. The sampled values depend on the detector from which they are obtained and can be considered as samples of a function of the detector position.

For example, if the sampled values all correspond to the same sampling period and if the detectors are regularly arranged in a rectangular matrix, the detector positions can be defined by rectangular coordinates X and Y and the sampled value is a function of X and Y. These variables X and Y can take only a succession of distinct values, corresponding to the various detector positions.

It is known that a two-dimensional Fourier transformation carried out on this function of the variables X and Y can provide a representation of the target from which the waves picked up by the detectors were reflected. More precisely, each value of the transformed function can be assigned to a particular direction and considered as representative of the intensity of a plane wave incident on the detector matrix from this direction.

Such a method of holographic echo-sounding is thus well adapted to finding the direction from which coherent waves arrive at the detector matrix. The output signals of the data processing arrangement comprising the Fourier transformation calculator can be applied to a display system providing a two-dimensional image of the target, providing that the target is far away so that the waves reflected from it arrive at the detector matrix as substantially plane waves.

It will be appreciated that this echo-sounding method can be carried out in a plane. The detector matrix is replaced by a line array of detectors with which the direction of a target is found in the plane containing the detector array and the target.

It has also been proposed to determine the distance of a target by irradiating it with a brief wave burst. The time delay between the transmission of the burst and its reception at the detectors after reflection from the target provides a measure of the target distance. In practice the burst is usually sufficiently long for the phase and amplitude detection in the reflected waves to be carried out effectively, the detectors being in operation during only a corresponding time interval. The only targets detected and examined in this way are those situated at a given range proportional to the time delay between the transmission of the burst and the reception interval.

These previously proposed methods have a disadvantage in that the images they provide are increasingly poor as the range to the target decreases. As the target approaches, the curvature of the wave fronts of the reflected waves is increasingly marked. This disadvantage is particularly serious when the propagation medium does not allow the waves to be transmitted over great distances. It is then possible to examine only close targets whose images are degraded by the wave front curvatures. The disadvantage can be reduced by using a smaller detector matrix, and the limit distance below which it is not possible to obtain an acceptable image of a target is in fact substantially proportional to the detector matrix dimensions. A diminution in the matrix dimensions is to be avoided, however, since the accuracy of the determination of the direction of the incident reflected waves becomes worse as the matrix becomes smaller.

The present invention is intended to provide improved echo-sounding apparatus.

In accordance with the present invention echo-sounding apparatus comprises: a coherent wave source, an array of detectors each providing an output signal significant of the phase and amplitude of that portion of a wave reflected from the target incident on the detector, circuitry for providing a reception function comprising samples of the detector output signals at periods delayed with respect to a sampling origin time by an amount proportional to the square of the distance from the sampled detector to a reference point in the array, and a calculator for carrying out a Fourier transformation on each reception function to provide an output signal representative of the target.

The invention will now be described in more detail, by way of examples only and with reference to the accompanying diagrammatic drawings in which the same elements are identified by the same reference numerals, and wherein.

Figure 1:
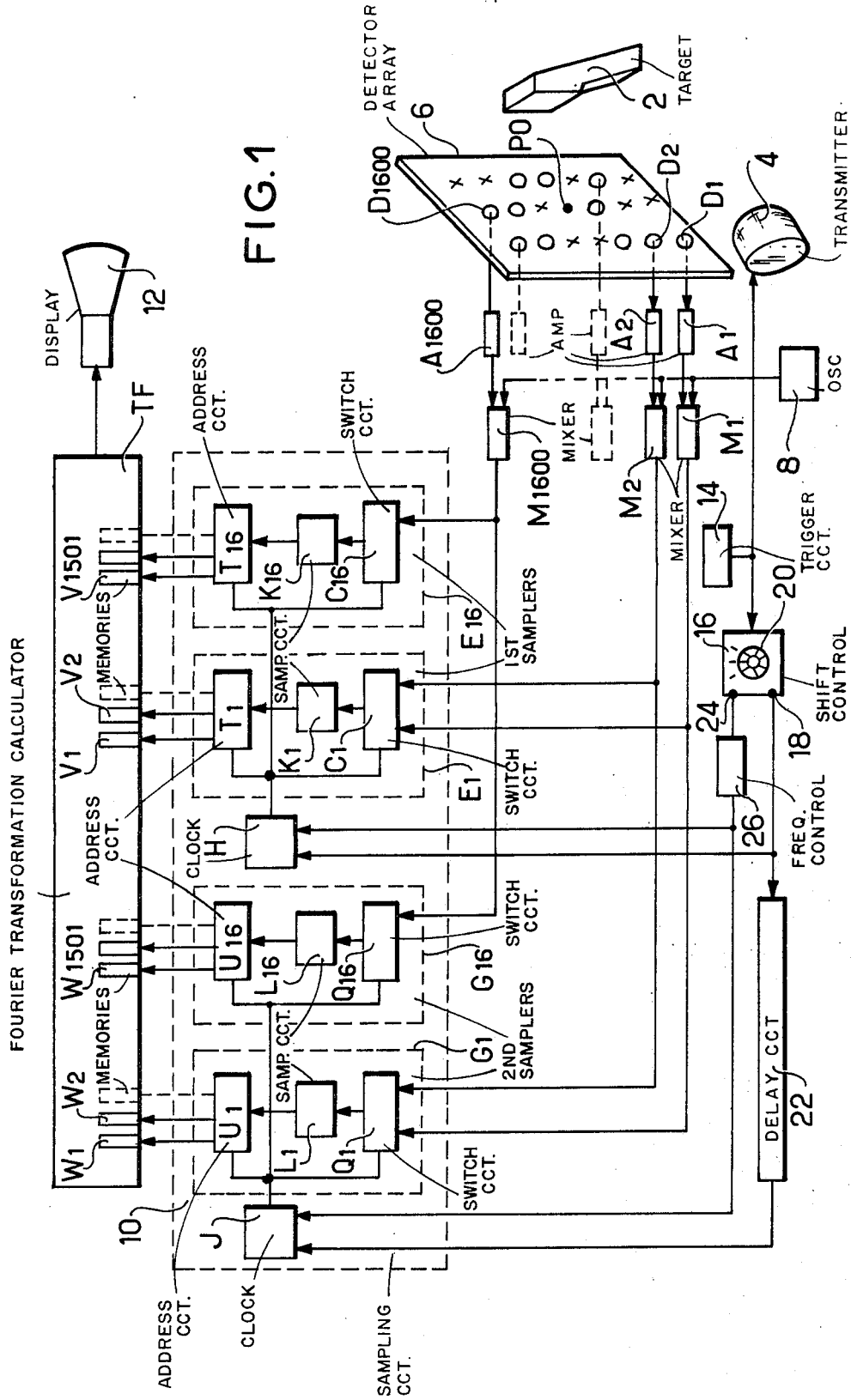
FIG. 1 is a schematic diagram of a first form of echo-sounding apparatus.

Referring to FIG. 1, a target 2, a coherent wave source 4, and a matrix array 6 of detectors for waves reflected from the target 2 are situated in a propagation medium, water in the present example. The wave source 4 suitably comprises an ultrasonic transmitter operating at a frequency of 500 kHz.

The matrix array 6 may comprise 128 rows and 128 columns. Detectors are situated at only some of the column/row intersections, as otherwise the number of detectors used would be prohibitive. For example, detectors may be provided at one intersection in ten or one intersection in one hundred, being arranged in pseudo-random fashion to minimize the interference effects produced by the "missing" detectors. The absence of detectors at some intersections is then substantially equivalent to noise affecting the detector output signals.

In the present example 1600 detectors D1, D2. D 1600 are used. To simplify the figure the detectors are shown situated at the intersections of three columns and 7 rows. The "missing" detectors are shown by X's, with the exception of that at the center of the matrix array which is indexed PO.

The coherent waves from the transmitter 4 are reflected from the target 2 towards the detector array 6. The output signal of each detector D1 to D1600 is applied to a respective amplifier A1 to A1600 whose output is connected to the input of a respective mixer M1 to M1600. Each mixer is also connected to an oscillator 8 providing a local oscillator frequency of 480 kHz which is mixed with the detector output signals to provide a frequency at 20 kHz which will hereafter be referred to as the reception signal. It is representative in phase and amplitude of the waves received by the respective detector.

The reception signals are applied to sampling circuitry 10 including 16 first samplers E1 to E16 and 16 second samplers G1 to G16. These 32 samplers are identical.

Each of the reception signals is applied to a first sampler and to a second sampler. The sampling periods are determined as follows:

The matrix 6 is divided into 16 sectors centered on a sampling origin consisting of the central intersection PO. Each sector includes 100 detectors D. The limit between adjacent sectors is substantially rectilinear and has as an origin the central intersection PO, forming a reference point.

The reception signals from the detectors of a given sector are all applied through their respective mixer circuits to the same first sampler and the same second sampler. In this way each matrix sector is associated with a respective first sampler and a respective second sampler.

The first sampler E1 includes a switching circuit C1 whose inputs are connected in a manner to be described below to the outputs of a group of mixer circuits corresponding to the associated matrix sector.

The 100 inputs of the switching circuit C1 are connected to respective outputs of mixer circuits M1 to M100. Its single output is connected to the input of a sampling circuit K1, and it operates to successively connect each of its inputs to its output, so that the mixer circuit outputs are connected to the sampling circuit K1 in a predetermined sequence.

The sampling circuit K1 suitably consists of a coding circuit providing digital output signals representative of each input signal. These output signals may be provided simultaneously on a multiplicity of outputs or sequentially on a single output. For simplicity in the diagram a single output has been shown.

The sampling circuit output is connected to the input of an addressing circuit T1 having 100 outputs. The addressing circuit T1 operates to connect the coding circuit output to the addressing circuit outputs in a predetermined sequence.

The other samplers are identical and are analogously referenced, the reference numerals U, L and Q for the second samplers G corresponding to reference numerals T, K and C for the first samplers E.

The switching and addressing circuits C and T of the first samplers E are synchronized by a clock H. The switching circuits and addressing circuits of the second samplers are likewise synchronized by a further clock J.

The synchronization is such that each passage from one input to the next of each switching circuit C occurs simultaneously with the passage from one output to the next of the corresponding addressing circuit T. As the two switching sequences are predetermined, each input of each switching circuit C or Q can be associated with a respective output of the addressing circuit T or U so that one switching circuit input and one addressing circuit output are always connected through the corresponding sampling circuit K or L.

The clocks H and J are of similar construction, and they provide identical clock frequencies in response to receipt of a triggering pulse. A predetermined number of clock pulses is required to produce each change of switching circuit input and addressing circuit output.

When the detectors are arranged in a sufficiently regular fashion in the matrix array 6, the predetermined number of clock pulses required for this switching action can be the same in each case, and may in fact consist of a single pulse. When the detector arrangement is irregular, however, this number of clock pulses can be varied during the course of each cycle in the appropriate manner.

The outputs of the first samplers E1 to E16 are connected to respective first sampled signal memories V1 to V1600. Likewise the second samplers G1 to G16 have their outputs connected to respective second sampled signal memories W1 to W1600. These memories V and W are contained in a Fourier transformation calculator TF.

Each detector $Dn$ (where $n$ takes the successive values 1 to 1600) is connected to the memory $Vn$ at a moment determined by the synchronous operation of a switching circuit and an addressing circuit, through the respective mixer circuit $Mn$. Likewise, the detector $Dn$ is connected to the memory $Wn$ at a predetermined moment.

The calculator TF supplies to a display system 12 the modulus values of a complex Fourier transformation. This transformation is carried out on a reception function which is also complex and in which the real part of each sample consists of the content of the respective first sampled signal memory, the imaginary part consisting of the content of the respective second sampled signal memory. This reception function is a function of the rectangular co-ordinates of the detectors in the matrix array 6. Each sample treated in the calculator TF has the value of the sample of this function corresponding to the co-ordinates of the respective detector.

A trigger circuit 14 which is manually or automatically operable in repetitive fashion provides an echo-sounding trigger pulse which is applied to the transmitter 4 which responds with a wave burst, and also to a shift control circuit 16 which provides on an output 18 a first switching trigger pulse delayed with respect to the echo-sounding trigger pulse. The delay between these pulses is automatically or manually adjustable, by means of a control knob 20 for example.

As is well known, this delay is representative of the distance between the transmitter 4 and the target 2.

The output 18 of the delay control circuit 16 is connected to the clock H and triggers the emission of clock pulses and thus the switching sequence in the switching circuits C and addressing circuits T of the first samplers E.

The output 18 is also connected to a delay circuit 22. The output pulse at 18 provides a first trigger pulse which emerges from the delay circuit 22, after an appropriate delay, as a second trigger pulse applied to the clock J. It triggers the emission of clock pulses and thus the switching sequence in the second samplers G. The delay between the first and second trigger pulses is one quarter of the period of the reception signal provided by the mixer circuits M.

The delay control circuit 16 provides on a second output 24 a time delay signal representing the delay introduced by circuits 16 between the echo-sounding trigger pulse and the first switching trigger pulse. This time delay signal is applied to a frequency control circuit 26 which simultaneously controls the output frequency of clocks H and J so that it is equal to the product of the time delay and a predetermined co-efficient. The duration of the switching process is small in relation to this time delay introduced by the circuit 16.

The operation of the apparatus will now be described on the assumption that the target 2 is at a long distance from the transmitter 4. In these circumstances the reflected waves incident on the matrix array 6 are substantially plane.

It will be assumed that the switching process synchronized by clocks H and J is instantaneous, although it will be appreciated that such instantaneous switching is not possible in practice.

The reception signal at the output of a mixer circuit Mn is sampled at different periods.

It is sampled by the sampling circuit K of the associated first sampler E at a moment later than the first switching trigger pulse by an amount proportional to $n$. The corresponding sampled value is recorded in the sampled signal memory V$n$.

It is also sampled, by the sampling circuit L of one of the second samplers G, at a moment later than the second switching trigger pulse by an amount also dependent on the value $n$. This interval is the same as in the sampling by the first sampler.

The time interval between the first and second samplings is thus the same as that between the first and second switching trigger pulses. The second sampled value is recorded in the sampled signal memory W$n$, and thus corresponds to a sampling period delayed with respect to that giving the content of memory V$n$ by one quarter period of the reception signal.

It can be shown mathematically that the modulus of the complex Fourier transformation constitutes a good representation of the target 2, on the assumption that the incident waves at the detector matrix array 6 are plane. In reality this assumption is often false, the incident waves generally having substantially spherical wave fronts.

In the apparatus just described, however, the sampling periods can be so selected that, with a succession of spherical waves arriving in a given direction, the sampled values of the reception signals are the same as they would be for a succession of plane waves arriving in the same direction, and as if the sampling periods were the same for all detectors.

The intervals between the sampling periods for the various detectors required to give this result can be calculated mathematically, as a function of the position of the target 2 in relation to the matrix array 6.

It has been found that the necessary values are very close to those calculated in the following manner:

The distance of each detector D from the origin PO is measured, and a sampling delay is assigned to each detector which is proportional to the square of this distance and inversely proportional to the distance of the target. If D represents the distance of the detector from point PO and Z the target range, the sampling delay is equal to $D^2/2ZC$, where C is the propagation speed of the waves in the propagation medium.

If E is the previously mentioned time delay, the sampling delay is equal to $D^2/E.C^2$.

It is not necessary for the origin to be situated at the center of the matrix, but the error resulting from applying these formula reduces as the origin approaches the matrix center.

In each sector of the detector array the detectors are successively sampled beginning with those closest to the origin PO. It will be appreciated that if the detectors are so arranged that the number per unit surface area is equal, the delay applied to the sampling of the reception signal from a detector with respect to the beginning of the sampling process is proportional to the square of the distance of this detector from the origin PO, provided that the time elapsed between the sampling instance of successive detectors is always the same.

In practice the arrangement of the detectors in a sector may not be sufficiently uniform, in which case it will be preferable for the period between sampling successive detectors to vary in an appropriate manner. This is why the predetermined number of clock pulses required for the switching between successive sampler inputs may be varied, as already mentioned.

The sampling delays in fact result from the evolution of the switching process. For each matrix sector, and thus for each sampler E, the switching operation carried out in the switching circuit C is such that in the respective sector the detector closest to the origin PO is first connected to a sampling circuit K. The next detector connected to the sampling circuit K is the next furthest from the origin PO, this process continuing until all the detectors of the sector have connected to connectedto the respective sampling circuit K.

It will be appreciated that the sampled signal memories V each correspond to a detector and are so connected in the calculator TF that the calculator takes into account the co-ordinates of the corresponding detector.

It can be shown mathematically that when the reception signals are at a lower frequency than the reflected waves, by virtue of the local oscillator mixing, the sampling delays must be multiplied by the ratio of the wave frequency to the reception signal frequency if the best possible representation of the target is to be obtained. The sampling delay is then: $D^2.Fr/E.C^2.Fb$, where $Fr$ and $Fb$ are the frequencies of the echo-sounding waves and the reception signals respectively.

The sampling delays can thus be considerably increased, so that the operational frequencies of the sampling systems can be consideraby reduced, so facilitating there design and construction.

It will be appreciated that the clock frequency of the clocks H and J depends on the time shift E, the time shift control circuit 16 controlling the clocks H and J through the frequency control circuit 26 so as to make the output frequency proportional to this shift.

The sampling delays can be produced other than by the sequential sampling process as just described. More particularly, the reception signals may be delayed by amounts varying in accordance with the detector from which they are obtained. Echo-sounding apparatus operating in this manner is shown in FIG. 2.

Figure 2:
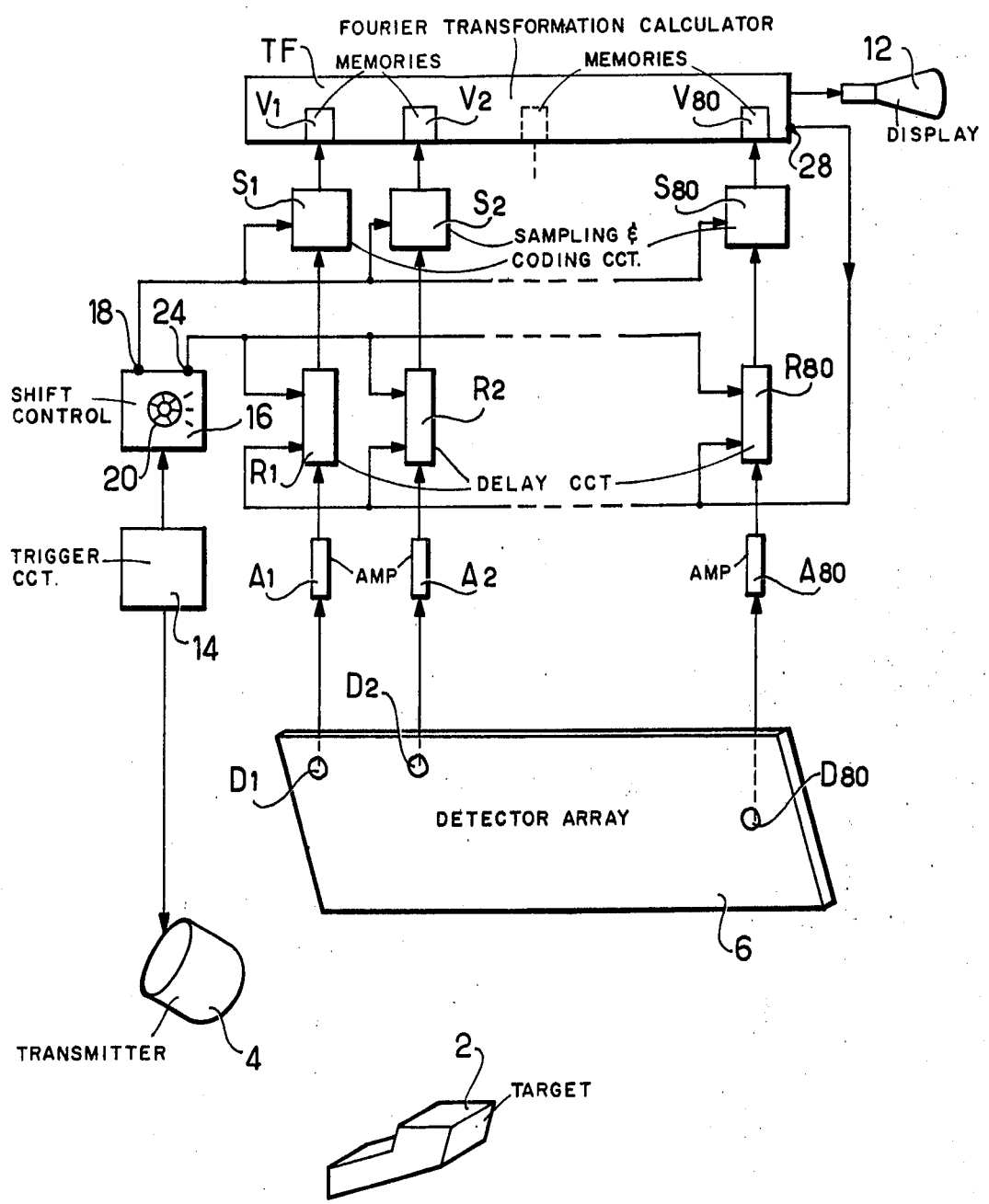
FIG. 2 is a schematic diagram of a second form of the apparatus.

Referring to FIG. 2, as well as those elements also shown in FIG. 1 and already described with reference to that figure, the apparatus includes delay circuits R1 to R80 connected to receive the output signals of the amplifiers A1 to A80. The delay circuits apply respective delays to the signals received from the amplifiers, the delayed signals being transferred to sampling and coding circuits S1 to S80. The digital signals provided by the circuits are recorded in sample memories V1 to V80 of the Fourier transformation calculator TF.

The circuits S1 to S80 are simultaneously triggered by a signal appearing at the output 18 of the time shift control circuit 16. The delays provided by the circuits R1 to R80 are predetermined, in which case a good image will only be obtained if the target is at a corresponding predetermined distance from the transmitter 4.

The delay applied to the reception signal from each detector is reduced as the distance of the detector from the origin PO increases. The delay is thus equal to a period T, common to all detectors, reduced by the sampling delay dependent on the detector and equal to $D^2/E.C^2$.

The signal delay is thus: $T - D^2/E.C^2$.

If a good image is required for varying target ranges, the delays provided by circuits R1 to R80 may be made adjustable. Each delay is controlled by the time shift signal provided at the output 24 of the time shift control circuit 16. Each delay circuit R1 to R80 includes calculator and control circuitry connected to receive the time shift signal and adapted to adjust the signal delay to $T - D^2/E.C^2$.

To obtain a still better image of the target 2, the signal delays may be varied in accordance with the direction of the target. To this end, once a first representation of the target has been obtained without taking its direction into account, the calculator TF provides on an output terminal 28 a signal representative of the target direction and corresponding to a maximum in the Fourier transformation. This signal is applied to the calculator and control circuitry of each delay circuit R1 to R80.

It should be mentioned that the first form of the apparatus, described with reference to FIG. 1, can present the disadvantage that as the target 2 recedes the operational frequency of the sampling systems must be increased. As this frequency cannot increase indefinitely, when the target 2 is very distant the image thereof is necessarily degraded. This degradation in the image can be made negligible, however, if a relatively low frequency reception signal is used, with the appropriate local oscillator 8 and mixer circuits M.

On the other hand, the first form of apparatus is much less expensive than the second form when a large number of detectors is required, at least when the target range, and still more so when the target bearing, must be taken into account.

This is because in the latter case each delay circuit must be provided with calculation and control circuitry, which is why the number of detectors and corresponding processing circuits in the second form of apparatus has been reduced to 80.

What we claim is:

1. Echo-sounding apparatus comprising a coherent wave source, an array of detectors each providing an output signal significant of the phase and amplitude of that portion of a wave reflected from the target incident on the detector, sampling circuit means for sampling the respective detector output signals at periods delayed with respect to a sampling origin time by an amount proportional to the square of the distance from the sampled detector to a reference point in the array, and calculating means for carrying out a Fourier transformation on each sample to provide an output signal representative of the target.

2. Apparatus as defined in claim 1, in which said sampling circuit means includes delay circuit means for delaying the respective detector output signals by a time which varies inversely with the distance of the respective detector from said reference point in the array, and means for sampling the delayed signals substantially simultaneously.

3. Apparatus as defined in claim 2, further including control circuit means for effecting intermittent operation of said wave source and for controlling said sampling circuit means to effect a time delay between the emission of a wave burst from said wave source and the reception of the reflected wave corresponding thereto, including means for controlling said delay circuit means to vary the sampling period delays in inverse proportion to variations in such time delay, which is indicative of the target range.

4. Apparatus as defined in claim 1, in which said sampling circuit means includes a set of samplers each operatively associated with a sub-group of detectors in the array, each sampler including a switching circuit with a respective input connected to each detector of the sub-group and a sample circuit to which the switching circuit inputs are connected in a predetermined sequence related to the increasing distance of the detectors from said reference point, and clock means for controlling said switching circuits to pass from one input to the next in response to the application of a predetermined number of clock pulses thereto.

5. Apparatus as defined in claim 4, in which the detectors are substantially uniformly distributed in the array and the sub-groups of detectors comprise the detectors in respective angular segments centered at the reference point, the predetermined number of clock pulses applied to said switching circuits being the same for all passages from one switching circuit input to the next.

6. Apparatus as defined in claim 4, wherein said control circuit means includes means for controlling the frequency of generation of clock pulses by said clock means in accordance with the time delay between the emission of a wave burst from said wave source and the reception of the reflected wave corresponding thereto so that the clock period is substantially equal to the product of this time delay and a predetermined coefficient.

7. Apparatus as defined in claim 6, further including a respective mixer circuit connected to each detector and connected to a local oscillator to transpose the detector output signal frequency to a lower value, the predetermined coefficient by which the clock period is multiplied being so chosen that the sampling period delay for each detector is substantially $D^2 \cdot Fr/E.C^2 Fb$, where D is the distance of the detector from the reference point, E is the time delay corresponding to the target range, C is the propagation speed of the echo-sounding waves, and $Fr$ and $Fb$ are respectively the frequency of those waves and the transposed frequency of the detector output signals.

8. Apparatus as defined in claim 4, in which each sample circuit consists of a digital coding circuit for the signals received from the switching circuit, and each sampler further includes addressing circuit means for switching the coding circuit output to successive calculator inputs in a predetermined sequence, said addressing circuit means being controlled by said clock means to operate synchronously with its associated switching circuit.

9. Apparatus as defined in claim 4, wherein said control circuit means includes a trigger circuit connected to said wave source for effecting operation thereof to direct a wave toward said target and delay control means connecting said trigger circuit to said clock means with a selectively variable delay to actuate said clock means.

10. Apparatus as defined in claim 9, further including additional sampling circuit means for sampling the respective detector output signals one quarter period of the reception signal later than the first-mentioned sampling circuit means.

11. Apparatus as defined in claim 10, wherein said additional sampling circuit means is comprised of the same elements as said first-mentioned sampling circuit means, and the clock means in said additional sampling circuit means is connected to said delay control means through an additional delay circuit.

* * * * *